US012750670B2

(12) United States Patent
Vashist et al.

(10) Patent No.: US 12,750,670 B2
(45) Date of Patent: Sep. 29, 2026

(54) APPARATUS AND METHOD FOR DETERMINING A LOCATION-SPOOFING APPLICATION

(71) Applicant: GRABTAXI HOLDINGS PTE. LTD., Singapore (SG)

(72) Inventors: Advitiya Vashist, Singapore (SG); Zhan Wei Lim, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 279 days.

(21) Appl. No.: 18/293,445

(22) PCT Filed: Aug. 2, 2022

(86) PCT No.: PCT/SG2022/050554

§ 371 (c)(1), (2) Date: Jan. 30, 2024

(87) PCT Pub. No.: WO2023/014299

PCT Pub. Date: Feb. 9, 2023

(65) Prior Publication Data

US 2024/0334192 A1 Oct. 3, 2024

(30) Foreign Application Priority Data

Aug. 4, 2021 (SG) ........................... 10202108554U

(51) Int. Cl.

*H04W 12/104* (2021.01)
*H04W 12/12* (2021.01)

(52) U.S. Cl.

CPC ......... *H04W 12/104* (2021.01); *H04W 12/12* (2013.01)

(58) Field of Classification Search

CPC ............................ H04W 12/104; H04W 12/12
See application file for complete search history.

(56) References Cited

U.S. PATENT DOCUMENTS

| | | | | |
|---|---|---|---|---|
| 10,621,343 | B1 | 4/2020 | Maciejak et al. | |
| 11,334,877 | B2 * | 5/2022 | Wyllie | G01S 19/25 |

(Continued)

FOREIGN PATENT DOCUMENTS

| | | | |
|---|---|---|---|
| CN | 111046658 | A | 4/2020 |
| CN | 111723368 | A | 9/2020 |

(Continued)

OTHER PUBLICATIONS

International Search Report and Written Opinion dated Feb. 23, 2023 which was issued in connection with PCT/SG2022/050554.

(Continued)

*Primary Examiner* — Mohamed Barakat

(74) *Attorney, Agent, or Firm* — Buckley, Maschoff & Talwalkar LLC

(57) ABSTRACT

The present disclosure provides an apparatus and a method for determining a location-spoofing application, the method comprising: generating a numeric representation of an application name of an application used for generating a geolocation position signal of a user using a variable derived from a list of application names relating to a plurality of other applications capable of generating a geolocation position signal of a user; and determining a prediction on whether the application is a location-spoofing application based on a scale of the generated numeric representation of the application name.

14 Claims, 5 Drawing Sheets

(56) References Cited

U.S. PATENT DOCUMENTS

| | | | | |
|---|---|---|---|---|
| 11,500,109 | B2 * | 11/2022 | Kaabouch | G01S 19/215 |
| 2011/0227787 | A1 * | 9/2011 | Gum | G01S 19/215 342/357.28 |
| 2019/0041223 | A1 * | 2/2019 | Yang | G01C 21/30 |
| 2020/0112570 | A1 | 4/2020 | Yang et al. | |
| 2020/0225358 | A1 | 7/2020 | Kaabouch et al. | |
| 2020/0285464 | A1 * | 9/2020 | Brebner | G06N 20/00 |
| 2020/0403992 | A1 * | 12/2020 | Huffman | H04W 12/12 |
| 2021/0200872 | A1 | 7/2021 | Cannings et al. | |
| 2021/0248241 | A1 * | 8/2021 | Balkanski | G06V 20/95 |
| 2023/0208875 | A1 * | 6/2023 | Do | H04L 63/1425 726/22 |

FOREIGN PATENT DOCUMENTS

| | | | |
|---|---|---|---|
| KR | 10-1803888 | B1 | 12/2017 |
| WO | 2021053647 | A1 | 3/2021 |

OTHER PUBLICATIONS

Ting Chen .: “Advanced technologies for detecting and preventing fraud at Uber”, Uber Engineering Blog, Jun. 14, 2018.

J. Campos et al.: “A machine learning based smartphone app for GPS spoofing detection”, Purdue University Northwest Research Paper Dec. 12, 2020.

* cited by examiner

APPARATUS AND METHOD FOR DETERMINING A LOCATION-SPOOFING APPLICATION

CROSS REFERENCE

This is a US National Stage Application under 35 USC 371 claiming benefit of and priority to International Application No. PCT/SG2022/050554, filed on Aug. 2, 2022, and claiming benefit of and priority to Singapore Application No. 10202108554U filed on Aug. 4, 2021, each of which is incorporated by reference herein in their entirety.

TECHNICAL FIELD

The present invention relates generally to an apparatus and a method for determining a location-spoofing application.

BACKGROUND

Global Positioning System (GPS) spoofing is a major problem to ride-hailing organizations and service providers as drivers are able to spoof their GPS information to get better allocation or to take a completion of rides and leads to a loss of trust tor ride-hailing organizations in the mind of passengers as well as drivers.

To spoof their GPO information, drivers usually use applications developed by third party developers for this specific purpose. Therefore, it becomes imperative to identify or keep a tab on such applications and determine a location-spoofing application to address the above issues.

SUMMARY

According to a first aspect, the present disclosure provides an apparatus for determining a location-spoofing application, the apparatus comprising: at least one processor; and at least one memory including computer program code: the at least one memory and the computer program code configured to, with at least one processor, cause the apparatus at least to: generate a numeric representation of an application name of an application used for generating a geolocation position signal of a user using a variable derived from a list of application names relating to a plurality of other applications capable of generating a geolocation position signal of a user; and determine a prediction on whether the application is a location-spoofing application based on a scale of the generated numeric representation of the application name.

According to a second aspect, the present disclosure provides a method for determining a location-spoofing application, the method comprising: generating, by a prediction module of a location-spoofing application determination system, a numeric representation of an application name of an application used for generating a geolocation position signal of a user using a variable derived, by the prediction module, from a list of application names relating to a plurality of other applications capable of generating a geolocation position signal of a user; and determining, by the prediction module, a prediction on whether the application is a location-spoofing application based on a scale of the generated numeric representation of the application name.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

DETAILED DESCRIPTION

Terms Description

Figure 1:
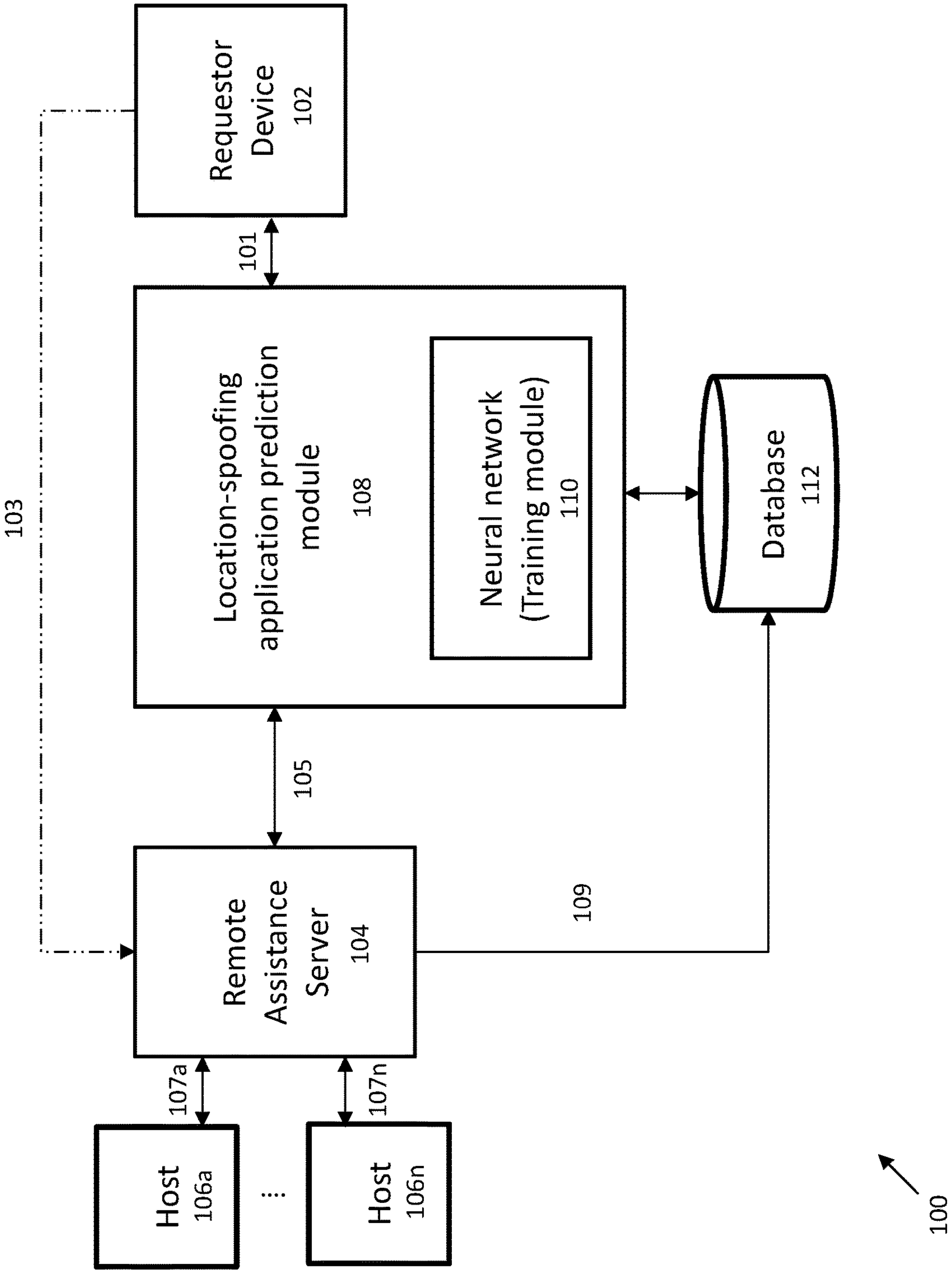
FIG. 1 shows a block diagram illustrating a system comprising a location-spoofing application prediction apparatus for determining a location-spoofing application according to an embodiment of the present disclosure.

User—a user may be any suitable type of entity, which may include a person, a rider, a pillion rider, a driver or a passenger who uses an application for generating a geolocation position signal. A user who is registered to a remote assistance server will be called a registered user. A user who is not registered to the remote assistance server will be called a non-registered user. The term user will be used to collectively refer to both registered and non-registered users.

Application—an application (or app) is a computer program designed to carry out by a processor of a computer or a mobile device to carry out a specific task, i.e. generate a geolocation position signal of a user of the computer or the mobile device in various embodiment of the present disclosure. An application may refer to a new application or an application with unknown geolocation position signal validity that is yet to be determined and predicted if it is a location-spoofing application. In various embodiments below, the term "location spoofing application" may be used interchangeably with the term "GPS spoofing application". The term "application" and "package" will be used interchangeably throughout the present disclosure.

Application name—an application name is associated with an application and can be used to differentiate the application from another application by a processor of a computer or a neural network or by a user. In various embodiments, an application name corresponds to a sequence of two or more characters. For sake of simplicity, English application names, formed using 26 English letters (A-Z), 10 digits (0-9) and special characters (non-alphabetic or numeric characters, e.g. blank character, next-line character and punctuations) are used to illustrate various embodiments in the present disclosure, however, it is appreciated that the application name may additionally or alternatively formed using letters or characters of a language other than English.

Character combination—a character combination is a combination of two or more consecutive character forming an application name. For example, the word "map" has three characters "m", "a" and "p" and three character combinations "ma", "ap" and "map". In various embodiments below, a character combination of a character in an application name refers to a character combination of the character and one or more characters prior to and/or following the character in the application name. For example, a character combination of a character "a" in an application name "GPSmap" may include "GPSma", "PSma", Sma", "ma" and "ap".

Prediction—a prediction refers to a determination and classification results on how likely an application is a location-spooling application. According to various embodiments, a prediction on whether an application is a location-spoofing application is determined and classified based on a scale of a numeric representation of the application's name. For example, an application may be classified and predicted as a location-spoofing application if it has a scale of a numeric representation of its application name close to 1 and may be classified and predicted otherwise if the scale is close to 0.

Numeric representation-a numeric representation is a number, a sequence of numbers, a matrix or a combination thereof which is generated and processed by a processor of a computer or a neural network to identify/represent the application name (or a character or a character combination) and differentiate the application name from another application name (or another character or another character combination). An example of a numeric representation is a 16-dimension vector. In various embodiments below, a numeric representation of an application name may be scaled from 0 to 1, and such scale of a numeric representation of an application name may correspond to a prediction on whether an application associated with the application name is a location-spoofing application. In one embodiment, an application associated with a scale of a numeric representation of its application name closer to 1 or 0 is determined/predicted to be or not to be a location-spoofing application respectively. Additionally, a sigmoid function is applied to the numeric representation to normalize its scale to be within 0 to 1.

A numeric representation of an application name is determined based on a numeric representation of each character and/or character combination of the application name, for example by merging the numeric representations of the characters and/or character combinations forming the application name into one numeric representation through mathematical operators such as addition and multiplication. In an embodiment, each character (e.g. English letters, digits and special characters) has a pre-set numeric representation stored in a database accessible by the computer or the neural network, and upon identifying each character forming the application name and its corresponding pre-set numeric representation, a variable trained or derived using a list of known applications is applied to the pre-set numeric representation to generate a numeric representation of the character. In one example, a pre-set numeric representation of a character is a vector (e.g. vector with same or different dimensions, or other types of vector) preconfigured by a processor for general application, and a variable is matrix (e.g. kernel matrix) configured to be applied to the pre-set representation to yield a 16-dimension vector representation of the character used for the purpose of determining a location-spoofing application.

A (pre-set) numeric representation of a character may be derived from a list of known applications and their application names. A scale of a (pre-set) numeric representation of a character, for example ranged from 0 to 1, may indicate a weightage of the character, if it appears in an application name of an application, in affecting a subsequent determination of a prediction on whether the application is a location-spoofing application.

In another embodiment, a numeric representation of a character combination is determined based on numeric representations of characters forming the character combination, for example, by merging the numeric representations of the characters forming the character combination into one numeric representation through mathematical operators such as addition and multiplication. Similarly, a scale of a numeric representation of a character combination, for example ranged from 0 to 1, may indicate a weightage of the character combination, if it appears in an application name of an application, in affecting a subsequent determination of a prediction on whether the application is a location-spoofing application.

Variable—a variable refers to a number, a sequence of numbers, a matrix or a combination thereof applied in a model or an algorithm to process and generate a numeric representation of a character, a character combination and/or an application name of an application. The same variable or different variables can be applied in a hierarchical model or a neural network consisting of more than one layer of processing. Examples of a variable includes a convolution filter/matrix. In various embodiments below, applying a variable may refer to sending an input to a neural network (input layer), processing the input by the neural network through a series of algorithm or layers and generating by the neural network (output layer) an output, the input and the output in various embodiments below referring to an application name and a numeric representation of the application name.

A variable is derived, for example by a neural network, from a list of application names corresponding to a list of known applications such as location-spoofing applications that have been disallowed (banned) from being used for generating a geolocation position signal of a user and known location-spoofing applications that are allowed to be used by less than a pre-configured number of users (e.g. less than 5000 users) for generating a geolocation position signal. This is assuming that the applications that are used more than the pre-configured number of users (e.g. more than 5000 users) are popular applications and it is unlikely that such applications are used to spoof location. In another embodiment, the list of known application may also include applications that known to be legitimate and are not location-spoofing applications (hereinafter referred to as "known legitimate applications" in the present disclosure). A variable is modified and optimized such that when generating a numeric representation of an application name of a known application (with a known prediction outcome) using the variable, a resulting scale of a numeric representation of the application name corresponds to the known prediction outcome, i.e. an outcome of being determined or predicted as a location-spoofing application (e.g. a scale of a numeric representation close to 1). In various embodiments, such modification and optimization of the variable may be referred to as neural network training.

Additionally or alternatively, a variable is modified and optimized based only on a list of application names corresponding to a list of known location-spoofing applications that are used by at least one user to generate a geolocation position signal within a certain time period (e.g. in the past year, in recent three months, etc.).

In an embodiment, a new list of known applications with known prediction outcome by a neural network is extracted, and the variable is further modified and optimized using the new list at every fixed time interval (e.g. every month). With more variable optimization using more training data (known applications) and frequency, the variable can the be used to make new and better predictions.

Database—a database stores data relating to a user (driver) and an application, which includes user accounts and details, records of transactions, application name, application identifier, application data, application type and details, data usage, records of application usage and number of users of application obtained from mobile devices and computers of the users. Unless specified otherwise, an application stored in the database is assigned to an identifier and can be referred to as a known application as at least part of data or details together with the identifier of the application can be used to identify the application and differentiate the application from other application. A database may store a master list of known applications. Examples include a master list of applications that have been banned from being used, a master list of applications that are allowed to be used by less than a pre-configured number of users and a master list of applications that are known to be legitimate and are not location-spoofing applications. In one embodiment, such master list of applications will be used to label one or more applications and those applications that are labelled will form a list of known applications for optimizing variable, model and neural network.

Example Implementations

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which form public knowledge through their use. Such should not be interpreted as a representation by the present inventor(s) or the patent applicant that such devices in any way form part of the common general knowledge in the art.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "calculating", "determining", "updating", "generating", "initializing", "outputting", "receiving", "retrieving", "identifying", "dispersing", "authenticating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

As mentioned earlier, there is a need to develop a solution to determine a location-spoofing application. Determine a location-spoofing application, namely: (i) preventing usage of such application by drivers: (ii) helping operations team determine the presence of suspicious applications on drivers' phones.

Currently this process is done by using a combination of rules and manual review by an officer (e.g. quality assurance/fraud investigation officer) on package names on drivers' phones. For example, any application that contains 'fake' in its name might get put on the ban list or an officer might stumble upon an application with a gibberish name and then that package name is added to the ban list. Though there usually is a clear cut pattern the GPS spoofing application follow in terms of names, this process is very tedious and time consuming for both as there are millions of applications present on drivers' phones and the pattern of the name for GPS spoofing applications change over time.

The present disclosure provides a solution to continuously train a machine learning model that classifies each application on drivers' phones as a GPS spoofing application or not a GPS spoofing app. The advantages of using this solutions is that (i) it can learn patterns from the entire dataset and do predictions at a scale and speed that is not possible for humans and (ii) it is an evolving system that learns and optimizes over time and therefore it becomes hard for the drivers to evade detection and determination.

FIG. 1 shows a block diagram illustrating a system 100 comprising a location-spoofing application prediction apparatus 108 for determining a location-spoofing application according to an embodiment of the present disclosure.

The system 100 comprises a requestor device 102, a location-spoofing application prediction module (apparatus) 108, a remote assistance server 104, remote assistance hosts 106*a*-106*n*, and a database 112.

The requestor device 102 is in communication with location-spoofing application prediction module 108 and/or a remote assistance server 104 via a connection 101 and 103, respectively. The connection 101 and 103 may be wireless (e.g., via NFC communication, Bluetooth, etc.) or over a network (e.g., the Internet). The connection 101 and 103 may also be that of a network (e.g., the Internet). In one arrangement, the location-spoofing application prediction module 108 and the request device 102 are combined and the connection 101 may be an interconnected bus.

The location-spoofing application prediction module 108 is further in communication with the remote assistance server 104 via a connection 105. The connection 105 may be over a network (e.g., a local area network, a wide area network, the Internet, etc.). In one arrangement, the location-spoofing application prediction module 108 and the remote assistance server 104 are combined and the connection 105 may be an interconnected bus.

The remote assistance server 104, in turn, is in communication with the remote assistance hosts 106*a*-106*n* via respective connections 107*a*-107*n*. The connections 107*a*-107*n* may be a network (e.g., the Internet).

The remote assistance hosts 106*a*-106*n* are servers. The term host is used herein to differentiate between the remote assistance hosts 106*a*-106*n* and the remote assistance server 104. The remote assistance hosts 106*a*-106*n* are collectively referred to herein as the remote assistance hosts 106, while the remote assistance host 106 refers to one of the remote assistance hosts 106. In an example, the remote assistance host 106 may be one of a computer, a mobile device, a geolocation positioning device, a computing device in a watch or similar wearable and the like used and managed by a driver. The remove assistance host 106 may also be a vehicle telematics system, a driver monitoring system, or one that stores information relating to a driver or other operations. The remote assistance host 106 is configured to send a signal (e.g. geolocation position signal), depending on the type of the host 106 and signal, to the requestor device 102, location-spoofing application prediction module 108 and/or database 112.

The remote assistance server 104 is a central server that manages resources and application data communications to/from each of the remote assistance hosts and decides which of the remote assistance hosts 104 to administers resources and transmit/receive application data to/from via connections 107*a*-107*n*. The connections 107*a*-107*n* are collectively referred to herein as the connections 107, while the connection 107 refers to one of the connections 107. The connections 107 may be wireless (e.g., via NFC communication, Bluetooth, etc.) or over a network (e.g., the Internet).

Use of the term 'server' herein can mean a single computing device or a plurality of interconnected computing devices which operate together to perform a particular function. That is, the server may be contained within a single hardware unit or be distributed among several or many different hardware units.

In the illustrative embodiment, each of the devices 102 and 106, module 108, and server 104 provides an interface to enable communication with other connected devices 102 and 106, module 108 and/or server 104. Such communication is facilitated by an application programming interface ("API"). Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof.

The remote assistance server 104 is associated with an entity (e.g. a company or organization or moderator of the service). In one arrangement, the remote assistance server 140 is owned and operated by the entity operating the server 108. In such an arrangement, the remote assistance server 140 may be implemented as a part (e.g., a computer program module, a computing device, etc.) of the module 108.

The remote assistance server 104 is also configured to manage the registration of users. A registered user (driver) has a remote access account (see the discussion above) which includes details of the user. The registration step is called on-boarding.

It is not necessary to have a remote assistance account at the remote assistance server 104 to access the functionalities of the remote assistance server 104. However, there are functions that are available to a registered user. For example, it may be possible that only a registered user is able to receive renumeration as a driver of a ride-hailing service.

The on-boarding process for a user is performed by the user through one of the host device 106. In one arrangement, the user downloads an application (which includes the API to interact with the remote assistance server 104). In another arrangement, the user accesses a website (which includes the API to interact with the remote assistance server 104) through the host 106. The user is then able to interact with the remote assistance server 104 to via the host 106.

Details of the registration include, for example, name of the user, address of the user, emergency contact, driver license and other traffic accident information and the like. Once on-boarded, the user would have a remote assistance account that stores all the details, for example in database 112 or a separate database (not shown) within the server 104.

The requestor device 102 is associated with an entity (e.g. a company or organization) or a subject (e.g. requestor) who is a party to a request to determine a location-spoofing application and manages (e.g. establishes, administers) resources relating to a driver or a user of a host 106. The requestor may be quality assurance/fraud investigation officer who is assisting to ensure the drivers comply with proper conducts. The requestor device 102 may be a computing device such as a desktop computer, an interactive voice response (IVR) system, a smartphone, a laptop computer, a personal digital assistant computer (PDA), a mobile computer, a tablet computer, and the like. In one example arrangement, the requestor device 102 is a computing device in a watch or similar wearable and is fitted with a wireless communications interface.

Operations of Location-Spoofing Application Prediction Module 108

The location-spoofing application prediction module 108 comprising a neural network (or training module) 110 is configured to determine a location-spoofing application. The module 108 may be a standalone apparatus or combined with the requestor device 102, database 112 and/or remote assistance server 104 to form a single apparatus. The module 108 comprises at least one processor (not shown) and at least one memory (not shown) including computer program code configured to, with the at least one processor, cause the module 108 to generate, using neural network 110, a numeric representation of an application name of an application used for generating a geolocation position signal of a user using a variable derived from a list of application name relating to a plurality of other applications capable of generating a geolocation position signal of a user. The location-spoofing application prediction module is further configured to determine a prediction on whether the application is a location-spoofing application based on a scale of the numeric representation of the application name generated by the neural network 110. Such operation may be initiated upon receiving a request from the requestor device 102.

In an embodiment, the database 112 is configured to store data relating to a user (driver) and an application, which includes user accounts and details, records of transactions, application data, application type and details, data usage, records of application usage and number of users of application obtained from mobile devices and computers of the users. The database 112 may store a master list of applications that have been banned from being used and a master list of applications that are allowed to be used by less than a pre-configured number of users.

In an embodiment, application names of applications that are used by all users (driver) in within a time period (e.g. in the past year) for generating a geolocation position signal are extracted/received from the hosts 106. The location-spoofing application prediction module 108 may be configured to compare the extracted/received application names against a master list of known location-spoofing applications stored in the database 112 and determine if any of the extracted/received application names matches one of the application names of the known applications in the master list. If any of the extracted/received application names matches one of the known applications in the master list, the extracted/received application name will be labelled (e.g. labelled as 1) and included in a list of application name for use to optimize variable and train the neural network 112.

The detailed operations of the neural network 110 and how the variable is derived, optimized, i.e. how the neural network 110 is trained, will be described in FIG. 4. It is noted that, using a variable applied by the neural network 110 is modified and optimized using the new list of application names such that the neural network 110 is able to generate a numeric representation of each application name in the list and determine each application name in the new list is a location-spoofing application based on a scale of the numeric representation (i.e. a scale close to 1). With that, the location-spoofing application prediction module 108 is configured to apply such optimized variable to generate a numeric representation of an application name of a new/unknown application and determine a prediction on whether the application is location-spoofing application based on a scale of the generated numeric representation.

In one embodiment, the location-spoofing application prediction module 108 is configured to, at every fixed time interval (e.g. every month), re-compare the extracted/received application names against the master list of known applications stored in the database 112, re-label and re-extract a new list of applications and optimize the variable and the neural network 110 based on the new list of applications such that the location-spoofing application prediction module 108 can make new and better predictions.

Figure 2:
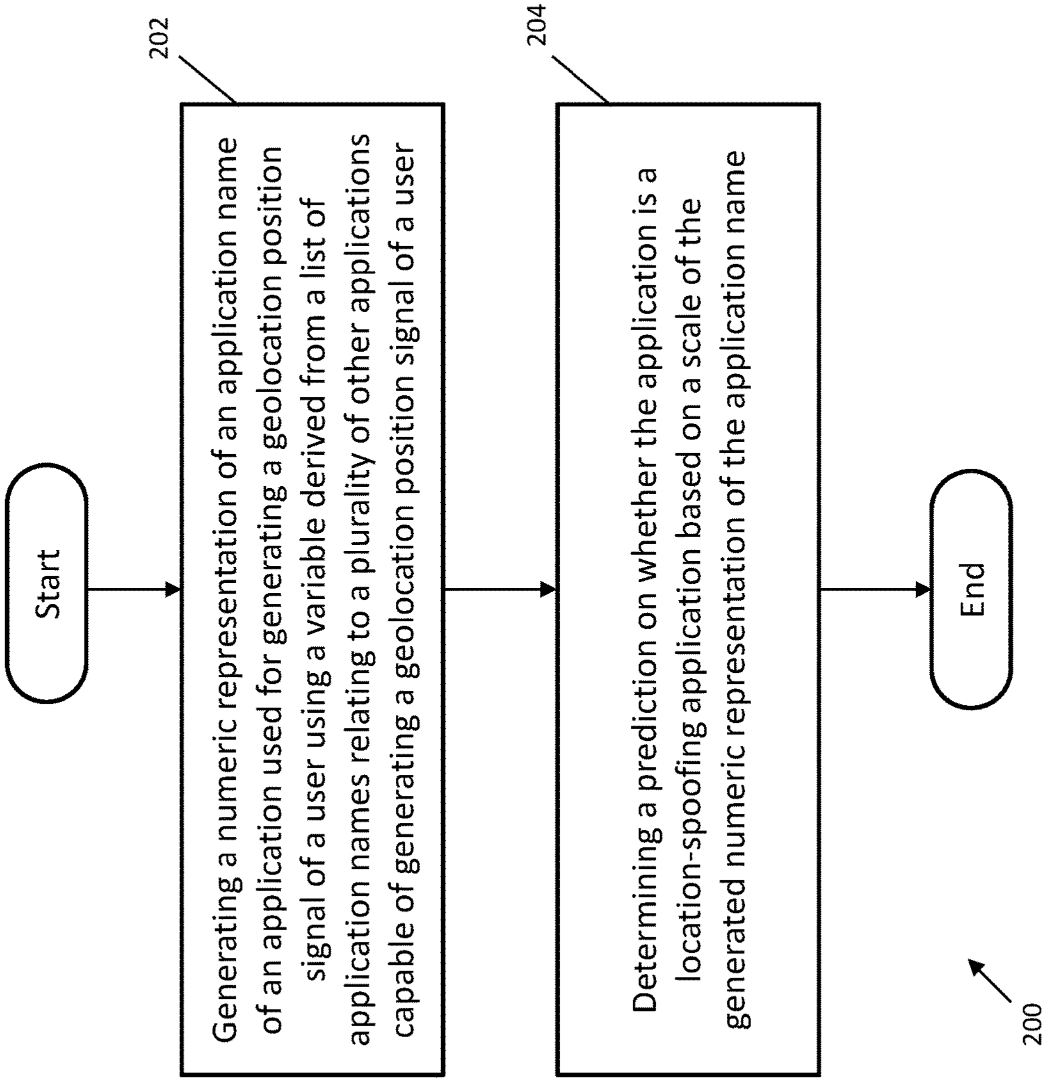
FIG. 2 shows a flow chart 200 illustrating a method for determining a location-spoofing application according to an embodiment of the present disclosure.

FIG. 2 shows a flow chart 200 illustrating a method for determining a location-spoofing application according to an embodiment of the present disclosure. In step 200, a step of generating a numeric representation of an application name of an application used for generating a geolocation position signal of a user is carried out using a variable derived from a list of application names relating to a plurality of other applications capable of generating a geolocation position signal of a user. In step 204, a step of determining a prediction on whether the application is a location-spoofing application is carried out based on a scale of the numeric representation of the application name generated in step 200.

Figure 3:
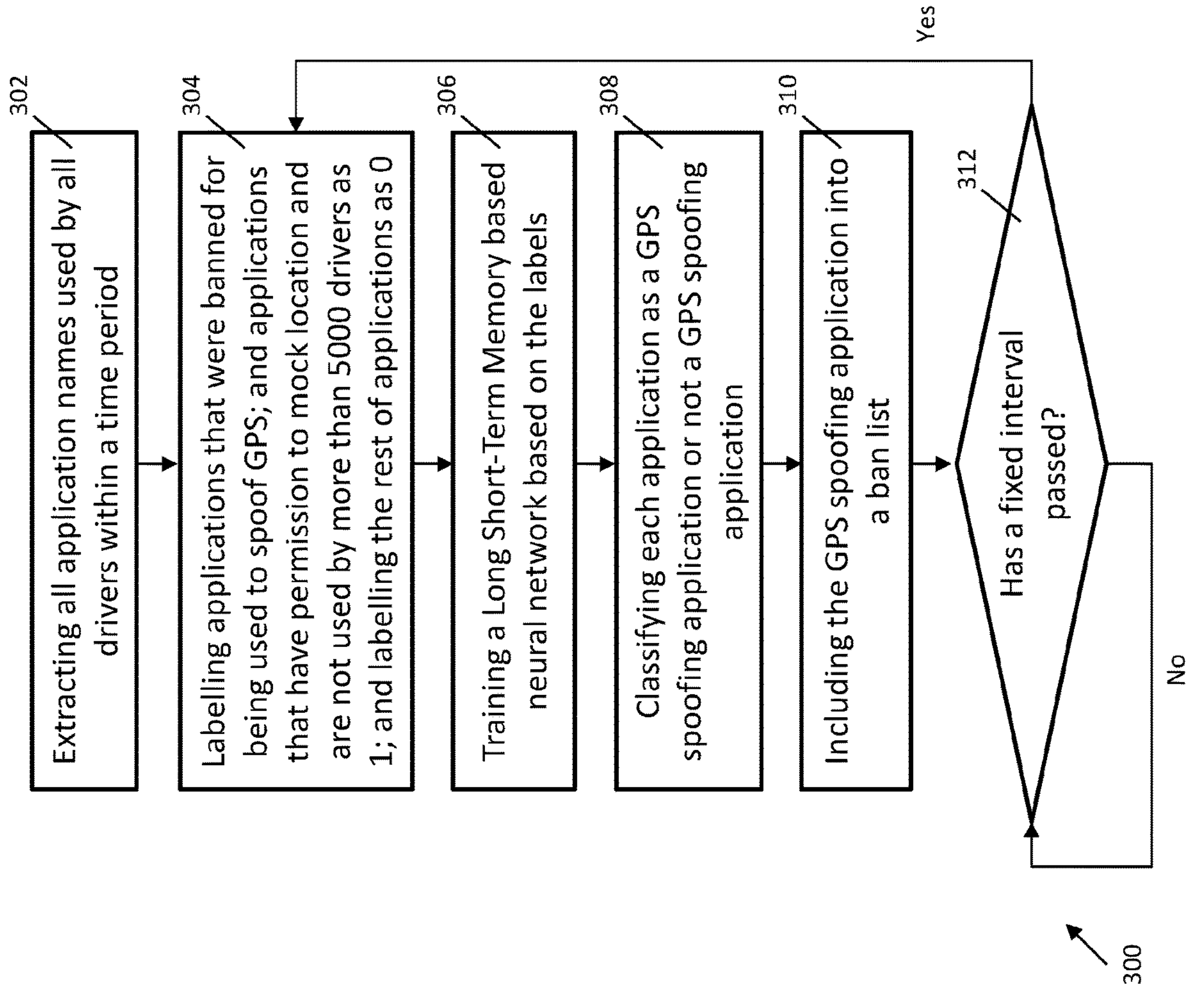
FIG. 3 shows a flow chart 300 illustrating a method for determining a location-spoofing applications in the system 100 in FIG. 1.

FIG. 3 shows a flow chart 300 illustrating a method for determining a location-spoofing applications in the system 100 in FIG. 1. In step 302, a step of extracting all application names used by all drivers within a time period is carried out. In step 304, a first step of labelling applications with application names matches one of a master list of applications that were banned for being used to spoof GPS as 1 is carried out. Further, a second step of labelling applications with application names matches one of a master list of applications that have permission to mock location which are not used by more than 5000 drivers as 1 is carried out. A third step of labelling the rest of applications extracted in step 302 as 0 is carried out. In step 306, a step of training a Long Short-Term Memory based neural network is carried out based on the labels. Further, in step 306, a variable used for generating a numeric representation of an application name and determining a prediction whether or not an application associated with the application name is derived.

In step 308, a step of classifying each application as a GPS spoofing application or not a GPS spoofing application. This step may be carried out by generating a numeric representation of an application name of each new/unknown application and application not labelled as 1 using the derived variable, and determining a prediction on whether the each new/unknown application and application not labelled as 1 is a GPS spoofing application or not a GPS spoofing application based on a scale of the numeric representation.

In step 310, a step of including the GPS spoofing application determined and predicted in step 308 into a ban list or the master list of applications that were banned for being used to spoof GPS is carried out. In step 312, it is determined if a fixed interval has passed, for example after the classification and determination of location-spoofing applications. If so, steps 304-310 are carried out again.

Figure 4:
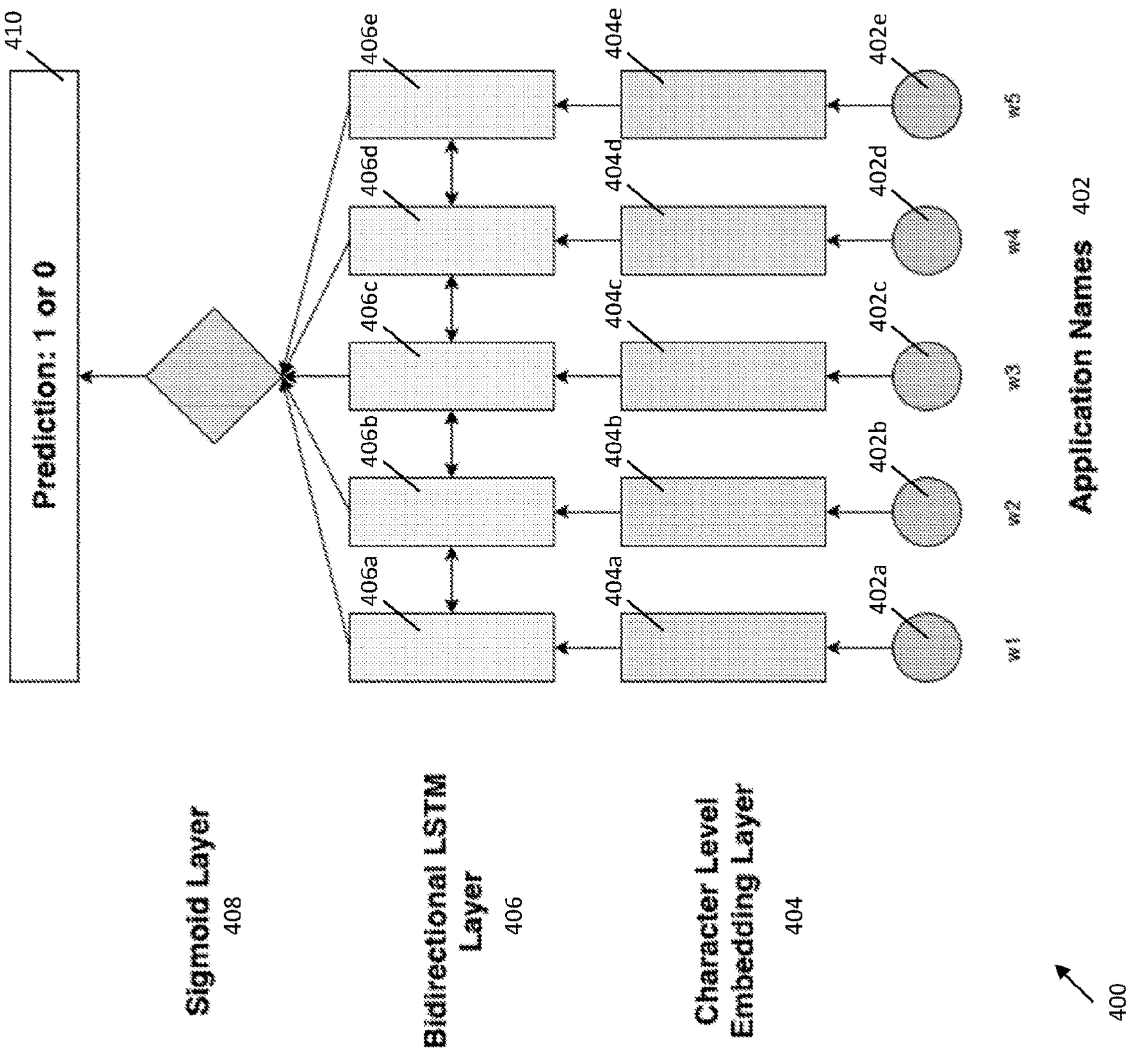
FIG. 4 shows a block diagram illustrating an architecture of a neural network according to an embodiment of the present disclosure.

FIG. 4 shows a block diagram illustrating an architecture of a neural network 400 according to an embodiment of the present disclosure. The neural network 400 is trained to determine a prediction on whether an application is a location-spoofing application. The neural network 400 comprises an input layer 402, an output layer 410, and three processing layers comprising a character level embedding layer 404, a bidirectional Long Short Term Memory (LSTM) layer 403 and a sigmoid layer 408 between the input layer 402 and output layer 410. Details of how the neural network generate an output of a prediction on whether an application is a location-spoofing application from the output layer 410 from an input of an application name of the application in the input layer 402 through a series of processing layers are illustrated in the following.

In this example, the application name in the input layer 402 comprises 5 characters w1-w5. In an embodiment, in the input layer 402, the neural network is configured to identify a pre-set numeric representation 402*a*-402*e* for each character input w1-w5. The pre-set numeric representation 402*a*-

402*e* is then input to the character level embedding layer 404 to generate a numeric representation of the character w1-w5.

The neural network 400 is then configured to input the numeric representation of each character into bidirectional LSTM layer 406. In this layer 406, for each character, a numeric representation of a character combination of the character and one or more characters of the application name prior to and/or following the character is generated. For example, upon generating a numeric representation of character w3, numeric representations of character combinations of characters w3 and w4, and characters w2 and w3 are respectively generated in the bidirectional LSTM layer 403. Alternatively or additionally, upon generating a numeric representation of character w3, numeric representations of character combinations of characters w3, w4 and w5, and characters w1, w2 and w3 are respectively generated in the bidirectional LSTM layer 403. In this embodiment, multiple numeric representations generated in relation to a character may be merged or stacked the numeric representation of the character to form a merged numeric representation 406*a*-406*e*.

The neural network is further configured to input all numeric representations relating to character combinations generated in the bidirectional LSTM layer 406, merge them through a sigmoid layer 408 such that a numeric representation of the application name is generated and fall within a pre-determined range of numeric representation of 0 to 1. The neural network then configured to output the numeric representation of the application name through output layer 410 to determine a prediction on whether an application associated with the application name is a location-spoofing application based on a scale of the numeric representation.

It is noted that, prior to predicting or determining if a new/unknown application is a location-spoofing application, the neural network 400 is optimized/trained (with corresponding variable(s) applied in the character level embedding layer 404 and the bidirectional LSTM layer 406) using a list of known application names (with known prediction outcomes), e.g. a list of known location-spoofing application name, such that, when every known application name from the list of known applications is input to the neural network 400 through the character level embedding layer 404, the bidirectional LSTM layer 406 and the sigmoid layer 408 and applications of the variable, the network neural 400 is capable of generating a resulting scale of a numeric representation of every known application name and a prediction corresponding to its known outcome (e.g. close to 0 or 1) in the output layer 410. In various embodiments, the neural network 400 is configured to apply such variable derived/optimized from the list of known location-spoofing applications to process a numeric representation input 402*a*-402*e* and 404*a*-404*e* to generate a numeric representation output 404*a*-404*e* and 406*a*-406*e* in the character level embedding layer 404 and the bidirectional LSTM layer 406 respectively.

In one example, the input to the input layer 402 is a package name 'com.grab'. The package name is passed through the character layer embedding layer 404. In the character level embedding layer 404, the package name is broken down and each distinct character (i.e. "c", "o", "m", ".", "g", "r", "a", "b") forming the package name is identified. For example, a 16-dimension vector is used a numeric representation of a character. After passing through the character level embedding layer 404, each character in the package name may be represented a 16-dimension vector as follows:

c—[0.3 0.2 0.1 0.1 . . . ]
o—[0.1 0.2 0.1 0.1 . . . ]
. . . .
b—[0.4, 0.5, 0.7 . . . ]

After converting the characters of the package name into vector representations in the character level embedding layer 404, the output of the character level embedding layer 404 is then input to the bidirectional LSTM layer 406.

Figure 5:
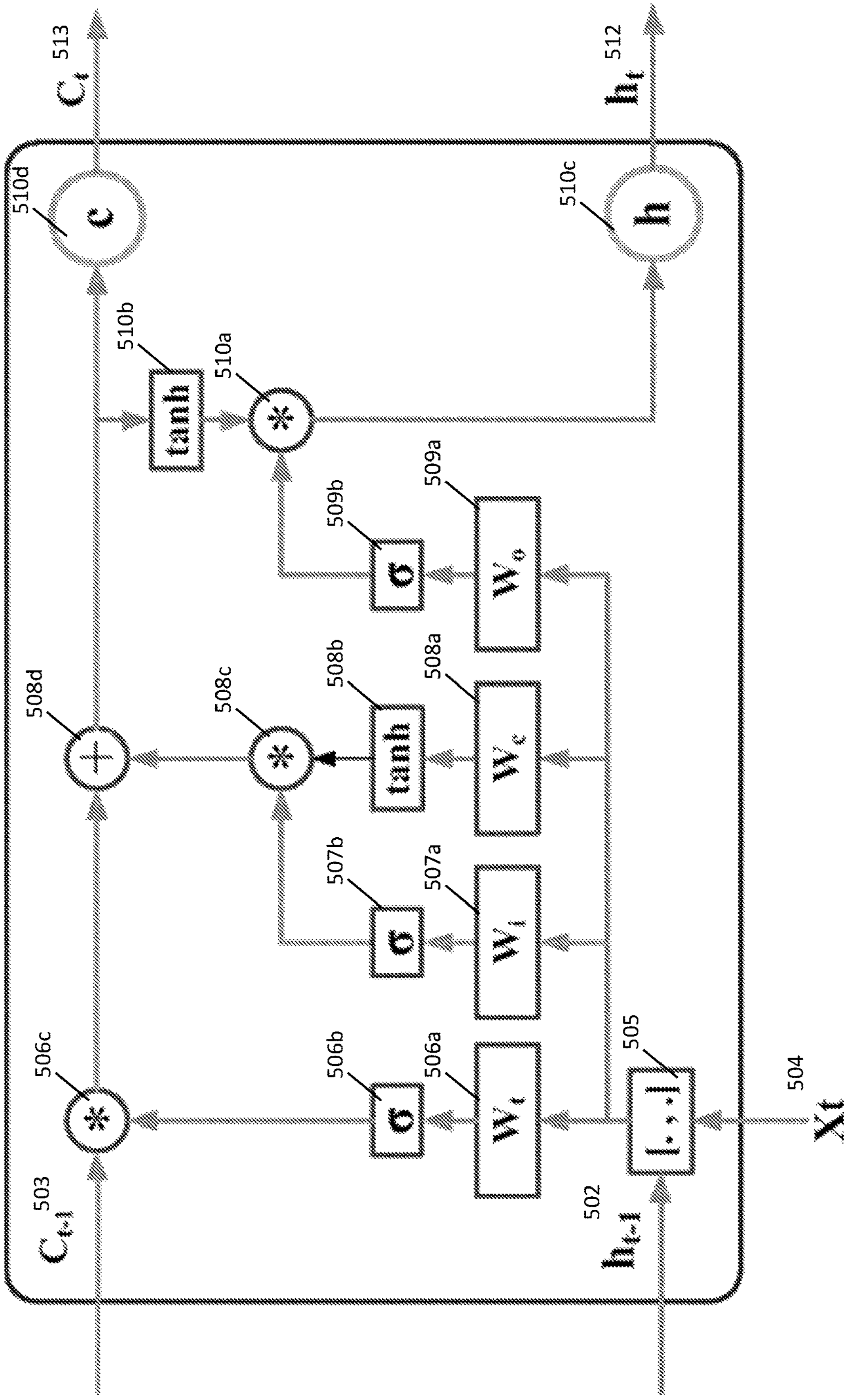
FIG. 5 shows a block diagram illustrating an architecture of a bidirectional LSTM layer according to an embodiment of the present disclosure.

FIG. 5 shows a block diagram 500 illustrating an architecture of a bidirectional LSTM layer 406 according to an embodiment of the present disclosure. In this embodiment, the architecture of the LSTM layer 406 comprises a forget gate, which collectively represented by blocks 506*a*, 506*b*, 506*c*, an input gate, which collectively represented by blocks 507*a*, 507*b*, and a output gate, which collectively represented by blocks 509*a*, 509*b*. In this embodiment, a processing of LSTM layer 406 at t-th position/character is illustrated, which takes in the output of the character embedding layer 404 at t-th position/character as part of an input, where t could be any number from 1 up to the number of character of the application name. For example, for a package name 'com.grab' which is made of 8 characters, t can be any number from 1 to 8.

In forward direction LSTM of the bidirectional LSTM layer 406, the processing of the LSTM layer 406 is carried out in a forward direction, i.e. with incremental t value. That is, after the processing at t-th position/character is completed, the processing at (t+1)-th will be carried out (it any). For example for 'com.grab', the embedding of c would be passed first, then o and so on.

In a forward direction LSTM of the bidirectional LSTM layer 406, the following equations is applied:

$$f_t = \sigma(W_f \cdot [h_{t-1}, x_t] + b_f) \quad \text{equation (1)}$$

$$i_t = \sigma(W_i \cdot [h_{t-1}, x_t] + b_i) \quad \text{equation (2)}$$

$$\tilde{C}_t = \tanh(W_C \cdot [h_{t-1}, x_t] + b_C) \quad \text{equation (3)}$$

$$C_t = f_t \times C_{t-1} + i_t \times \tilde{C}_t \quad \text{equation (4)}$$

$$o_t = \sigma(W_o \cdot [h_{t-1}, x_t] + b_o) \quad \text{equation (5)}$$

$$h_t = o_t \times \tanh(C_t) \quad \text{equation (6)}$$

where $x_t$ is an input of character level embedding at t-th position;

$h_t$ is a hidden state (output) of LSTM layer at t-th position;

$C_t$ is a cell state (output) of LSTM layer at t-th position;

$h_{t-1}$ is a hidden state of LSTM layer at (t−1)-th position;

$C_{t-1}$ is a cell state of LSTM layer at (t−1)-th position;

$W_f$, $W_i$, $W_c$, and $W_o$ are convolution weights (variables) for a forget gate, an input gate, an estimated cell state, and an output gate respectively; and σ and tanh are bidirectional LSTM sublayers where sigmoid activation function and tanh activation function are applied respectively. A sigmoid function 506*b*, 5067*b*, 509*b* squishes values between 0 and 1 while a tanh activation function 508*b*, 510*b* squishes values to always be between −1 and 1.

A hidden state at (t−1)-th position/character $h_{t-1}$ 502 (previous output of input $x_{t-1}$ (not shown)) and a current input from the character level embedding 404 at t-th position/character $x_t$ 504 is concatenated into an array or a vector of input at t-th position/character $[h_{t-1}, x_t]$ (hereinafter referred to as input vector 505). For example, for a package name 'com.grab', when t=7, a hidden state at $6^{th}$ position (an output of the LSTM processing for character "r") and a current input at 7th position (output from character level embedding 404 for character "a") are combined.

The input vector 505 is then sent to a forget gate. The forget gate determines which data/information and what extent of the data/information should be thrown away or kept by applying a first variable, e.g. a convolution weight $W_f$ 506*a* and a sigmoid function σ, 506*b* to generate a value between 0 to 1. A sigmoid output value closer to 0 means to forget and a sigmoid output value closer to 1 means to keep. The sigmoid output is referred to a forget vector and will send for cell state processing at block 506*c*.

The input vector 505 is also sent to the input gate. The input gate determine which values is important and will be updated. In the input gate, a second variable, e.g. a convolution weight $W_i$ 507*a* and a sigmoid function σ 507*b*, is applied to the input vector 505 to generate a value between 0 to 1. A value closer to 0 means not important and a value closer to 1 means important. A third variable, e.g. convolution weight $W_c$ 508*a* and a tanh activation function σ 508*b* is also applied to the input vector to squish values between −1 and 1. By multiplying the sigmoid output from block 507*b* to the tanh output from block 508*b*, the sigmoid output will determine which information is important to keep from the tanh output and form an output of the input gate for further cell state processing at block 508*d*.

Regarding cell state, the cell state at (t−1)-th position $C_{t-1}$ (previous output of input $x_{t-1}$ (not shown)) is processed through a multiplication by the forget vector at block 506*c*. This will result in forgetting/keeping certain values in the cell state. Subsequently, the cell state is further processed through an addition by the output of the input gate and updates the cell state to a new cell state $C_t$ at block 508*d*. The new cell state generated at t-th position/character is output to the next LSTM layer processing for (t+1)-th position/character, i.e. a character subsequent to the character at t-th position, to generate a new cell state $C_{t+1}$ and a new hidden state $h_{t+1}$.

Noting the input vector 505 comprises a current input xx from the character level embedding 404 at t-th position/character $x_t$ 504 and previous hidden state at (t−1)th position $h_{t-1}$ 502, the input vector 505 is also transferred to the output gate to determine what the next hidden state $h_t$ should be. In the output gate, a fourth variable, e.g. a convolution weight $W_o$ 509*a* and a sigmoid function σ 509*b* is applied to the input to generate a value between 0 to 1. A tanh activation function 510*b* is then applied to the new cell state generated at block 508*d*. By multiplying the sigmoid output from block 509*b* to the tanh output from block 510*b*, the sigmoid output will determine which/what information the next hidden state $h_t$ should carry. A new hidden state $h_t$ is generated and then sent to the next LSTM processing for (t+1)-th position/character, i.e. a character subsequent to the character at t-th position, to generate a new cell state $C_{t+1}$ and a new hidden state $h_{t+1}$.

In backward direction LSTM of the bidirectional LSTM layer 406, the processing of the LSTM layer 406 is carried out in a backward direction, i.e. with decremental t value. That is, after the processing at t-th position/character is completed, the processing at (t−1)-th will be carried out (if any).

In a backward direction LSTM of the bidirectional LSTM layer 406, the same equations is applied by replacing "t−1" to "t+1". A hidden state at (t+1)-th position/character $h_{t+1}$ (previous output of input $x_{t+1}$) and a current input from the character level embedding 404 at t-th position/character $x_t$ 504 is concatenated into an array of input at t-th position/character $[h_{t+1}, x_t]$ prior to processing through the forget gate, the input gate and the output gate. Similarly, the cell state at (t+1)-th position $C_{t+1}$ (previous output of input $x_{t+1}$) is processed through a multiplication by the forget vector output from the forget gate and an addition by the output of the input gate to update the cell state to a new cell state $C_t$. The new cell state generated at t-th position/character is output to the next LSTM layer processing for (t−1)-th position/character, i.e. a character prior to the character at t-th position, to generate a new cell state $C_{t-1}$ and a new hidden state $h_{t-1}$.

In various embodiment, a hidden state, i.e. the output of the LSTM layer 406, is a numeric representation of a character combination, e.g. a vector, which can be used to as an output of the bidirectional LTSM layer 406 to the next layer (e.g. sigmoid layer 408 of neural network 400) for determining a prediction. Where the hidden states generated at the same t-th position in both forward and backward directions LSTM may be different, such hidden states at the same t-th position may be merged or concatenated to generate a single hidden state at t-th position of the bidirectional LTSM layer 406 prior to outputting it to the next layer for determining a prediction.

In the sigmoid layer 408 of the neural network 400, the output of the bidirectional LSTM layer 406 is transformed using the following equation:

$$s(h) = \frac{1}{e^{-w \cdot h}} \qquad \text{equation (7)}$$

where e is euler's number, w is weigh vector of 16 dimensions and h is the output (hidden state) of the previous layer (e.g. LSTM layer 406).

The sigmoid layer 408 allows a transformation of the output h from the LSTM layer 406 into a value between 0 to 1 which in turn can be used for making classification and determining a prediction. In one embodiment, an output value of the sigmoid layer 408 greater than 0.5 will be determined/predicted as a location spoofing application.

In various embodiment, when an application name of a known application (with known prediction outcome or actual/known output value of the sigmoid layer 408), e.g. known location-spoofing application, is input to neural network 400, the variables, such as convolution weights $W_f$, $W_i$, $W_c$, and $W_o$, applied in the forget gate, the input gate, the estimated cell state and the output gate in the bidirectional LSTM layer 406 respectively and weigh vector w in the sigmoid layer 408 are optimized and modified to generate a sigmoid value that matches the actual/known sigmoid value thus determining a prediction (e.g. a location-spoofing application) matching the known prediction outcome of the known application. This variable optimizing process is repeated and applied to all the other known applications in the database.

The neural network 400 is continuously optimized with more training data over time. In one embodiment, the neural network is configured to, at every fixed time interval (e.g. every month), retrieve a new list of known location-spoofing application names (with known prediction outcomes) from a database, optimize the variable and the neural network 110 based on the new list of applications such that the location-spoofing application prediction module 108 can make new and better predictions.

The foregoing describes only some embodiments of the present disclosure, and modifications and/or changes can be made thereto without departing from the scope and spirit of the invention, the embodiments being illustrative and not restrictive.

The invention claimed is:

1. An apparatus for determining a location-spoofing application, the apparatus comprising:
at least one processor; and
at least one memory including non-transitory computer-readable medium:
the at least one memory and the non-transitory computer-readable medium configured to, with at least one processor, cause the apparatus at least to:
generate a numeric representation of an application name of an application used for generating a geolocation position signal of a user using a variable derived from a list of application names relating to a plurality of other applications capable of generating a geolocation position signal of a user; and
determine a prediction on whether the application is a location-spoofing application based on a scale of the generated numeric representation of the application name.

2. The apparatus according to claim 1, wherein the at least one memory and the non-transitory computer-readable medium is further configured with the at least one processor to, at every fixed time interval:
extract the list of application names relating to the plurality of other applications stored in a database;
modify the variable;
generate a numeric representation of each of the list of application names relating to the plurality of other applications using the modified variable; and
determine that each of the list of application names is a location-spoofing application based on a scale of the numeric representation of each for the list of application names.

3. The apparatus according to claim 1, wherein the at least one memory and the non-transitory computer-readable medium is further configured with the at least one processor to:
generate a numeric representation of a character of the application name of the application using the variable derived from the list of application names relating to the plurality of other applications, wherein the numeric representation of the application name is generated based on the numeric representation of the character of the application name.

4. The apparatus according to claim 3, wherein the at least one memory and the non-transitory computer-readable medium is further configured with the at least one processor to:
generate a numeric representation of a character combination of the character and one or more characters of the application name prior to and/or following the character using the variable derived from the list of application names relating to the plurality of other applications; and
wherein the numeric representation of the application name is generated further based on the numeric representation of the character combination.

5. The apparatus according to claim 1, wherein, when processing one or more characters, the at least one memory and the non-transitory computer-readable medium is configured with the at least one processor to:
identify a pre-set numeric representation of the one or more characters; and
apply the variable derived from the list of application names relating to the plurality of other applications to the pre-set numeric representation of the one or more characters to generate a numeric representation of the one or more characters.

6. The apparatus according to claim 1, the at least one memory and the non-transitory computer-readable medium is configured with the at least one processor to:
receive a plurality of application names corresponding to a plurality of applications used by one or more users within a time period for generating a geolocation position signal, wherein the plurality of applications comprises the application and the plurality of other applications.

7. The apparatus according to claim 6, wherein at least one memory and the non-transitory computer-readable medium is configured with the at least one processor to:
compare each of the plurality of received application names against a list of application names stored in a database, wherein the list of application names corresponds to a list of location-spoofing applications, and each of the list of location-spoofing applications is either disallowed from being used for generating a geolocation position signal of a user or allowed from being used for generating a geolocation position signal of a user with a number of users less than a preconfigured number of users;
determine if one of the plurality of received application names matches one of the list of application names corresponding to the list of location-spoofing applications; and
generate the list of application names relating to the plurality of other applications to comprise the one of the plurality of received application names in response to the determination.

8. A method for determining a location-spoofing application, the method comprising:
generating, by a prediction module of a location-spoofing application determination system, a numeric representation of an application name of an application used for generating a geolocation position signal of a user using a variable derived, by the prediction module, from a list of application names relating to a plurality of other applications capable of generating a geolocation position signal of a user; and
determining, by the prediction module, a prediction on whether the application is a location-spoofing application based on a scale of the generated numeric representation of the application name.

9. The method according to claim 8, further comprising, at every fixed time interval:
extracting, by the prediction module, the list of application names relating to the plurality of other applications stored in a database of the location-spoofing application determination system in communication with the prediction module;
modifying, by the prediction module, the variable;
generating, by the prediction module, a numeric representation of each of the list of application names relating to the plurality of other applications using the modified variable; and
determining, by the prediction module, that each of the list of application name is a location-spoofing application based on a scale of the numeric representation of the each for the list of application name.

10. The method according to claim 8, further comprising:

generating, by the prediction module, a numeric representation of a character of the application name of the application using the variable derived from the list of application names relating to the plurality of other applications, wherein the numeric representation of the application name is generated based on the numeric representation of the character of the application name.

11. The method according to claim 10, further comprising:

generating, by the prediction module, a numeric representation of a character combination of the character and one or more characters of the application name prior to and/or following the character using the variable derived from the list of application names relating to the plurality of other applications; and wherein the numeric representation of the application name is generated further based on the numeric representation of the character combination.

12. The method according to claim 8, further comprising:

identifying, by the prediction module, a pre-set numeric representation of the one or more characters preconfigured by the prediction module and stored in a database of the location spoofing application determination system in communication with the prediction module;

applying, by the prediction module, the variable derived from the list of application names relating to the plurality of other applications to the pre-set numeric representation of the one or more characters to generate a numerical representation of the one or more characters.

13. The method according to claim 8, further comprising:

receiving, by the prediction module, a plurality of application names corresponding to a plurality of applications used by one or more users within a time period for generating a geolocation position signal, wherein the plurality of applications comprises the application and the plurality of other applications.

14. The method according to claim 13, further comprising:

comparing, by the prediction module, each of the plurality of received application names against a list of application names, wherein the list of application names corresponds to a list of location-spoofing applications stored in a database of the location-spoofing application determination system in communication with the prediction module, and each of the list of location-spoofing applications is either disallowed from being used for generating a geolocation position signal of a user or allowed from being used for generating a geolocation position signal of a user with a number of users less than a pre-configured number of users;

determining, by the prediction module, if one of the plurality of received application names matches one of the list of application names corresponding to the list of location-spoofing applications; and generating, by the prediction module, the list of application names relating to the plurality of other applications to comprise the one of the plurality of received application names in response to the determination.

* * * * *